(12) United States Patent  (10) Patent No.: US 8,575,910 B2
Young                     (45) Date of Patent:    Nov. 5, 2013

(54) SINGLE-CYCLE CHARGE REGULATOR FOR DIGITAL CONTROL

(75) Inventor: Chris M. Young, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 347 days.

(21) Appl. No.: 13/007,779

(22) Filed: Jan. 17, 2011

(65) Prior Publication Data

US 2011/0176337 A1      Jul. 21, 2011

Related U.S. Application Data

(60) Provisional application No. 61/296,694, filed on Jan. 20, 2010.

(51) Int. Cl.
    *G05F 1/00*          (2006.01)
(52) U.S. Cl.
    USPC .......................................... 323/282; 323/283
(58) Field of Classification Search
    USPC ...................... 363/21.1, 21.11; 327/107–110, 327/164–168
    See application file for complete search history.

(56) References Cited

U.S. PATENT DOCUMENTS

| | | | |
|---|---|---|---|
| 5,678,049 A | 10/1997 | Massie | |
| 5,694,305 A * | 12/1997 | King et al. | ................. 363/21.11 |
| 5,744,944 A | 4/1998 | Danstrom | |
| 5,845,141 A | 12/1998 | Massie | |
| 6,177,785 B1 | 1/2001 | Lee | |
| 6,366,224 B2 | 4/2002 | Cliff et al. | |
| 6,630,903 B1 | 10/2003 | Hann et al. | |
| 6,788,483 B1 | 9/2004 | Ferris et al. | |
| 6,936,999 B2 | 8/2005 | Chapuis | |
| 6,949,916 B2 | 9/2005 | Chapuis | |
| 7,000,125 B2 | 2/2006 | Chapuis et al. | |
| 7,023,672 B2 | 4/2006 | Goodfellow et al. | |
| 7,049,798 B2 | 5/2006 | Chapuis et al. | |

(Continued)

OTHER PUBLICATIONS

"Pin Programmable Universal and Bandpass Filters: MAX263/MAX264/MAX267/MAX268"; Maxim Integrated Products; 2008; 28 pages; Sunnyvale, CA, USA; retrieved from Internet: http://datasheets.maxim-ic.com/en/ds/MAX263-MAX268.pdf.

(Continued)

*Primary Examiner* — Adolf Berhane
*Assistant Examiner* — Emily P Pham
(74) *Attorney, Agent, or Firm* — Meyertons Hood Kivlin Kowert & Goetzel, P.C.; Jeffery C. Hood

(57) ABSTRACT

A single-cycle charge regulator (SCCR) may be used in operating a power converter at a constant frequency without requiring compensation. The SCCR may include a first control loop to generate an error value based on the output voltage of the power converter and a reference voltage, and to generate a first control value based on the error value to control steady-state behavior of the output of the power converter. A second control loop may generate a second control value based on the error value, to regulate response of the power converter to a transient deviation on the output voltage. A third control loop may operate to adjust a current (affected by the output voltage of the the power converter) subsequent to the transient deviation, according to a third control value derived from previous values of the first control value, the second control value, and the third control value, to keep the adjusted current commensurate with the current that was present prior to the transient deviation, while keeping the output voltage of the power converter at its desired steady-state value.

20 Claims, 14 Drawing Sheets

(56) References Cited

U.S. PATENT DOCUMENTS

| | | | |
|---|---|---|---|
| 7,068,021 | B2 | 6/2006 | Chapuis |
| 7,071,664 | B1 | 7/2006 | Teggatz et al. |
| 7,239,115 | B2 | 7/2007 | Chapuis et al. |
| 7,249,267 | B2 | 7/2007 | Chapuis |
| 7,266,709 | B2 | 9/2007 | Chapuis et al. |
| 7,315,156 | B2 | 1/2008 | Chapuis |
| 7,372,682 | B2 | 5/2008 | Chapuis |
| 7,382,676 | B2 | 6/2008 | Ballweber et al. |
| 7,394,445 | B2 | 7/2008 | Chapuis et al. |
| 7,449,872 | B2 | 11/2008 | Zolfaghari |
| 7,456,617 | B2 | 11/2008 | Chapuis et al. |
| 7,459,892 | B2 | 12/2008 | Chapuis |
| 7,554,778 | B2 | 6/2009 | Chapuis |
| 7,565,559 | B2 | 7/2009 | Chapuis |
| 7,583,487 | B2 | 9/2009 | Chapuis |
| 7,589,584 | B1 | 9/2009 | Bui |
| 7,602,260 | B1 | 10/2009 | Atesoglu |
| 7,619,402 | B1 | 11/2009 | Kwong |
| 7,646,382 | B2 | 1/2010 | Chapuis et al. |
| 2006/0273769 | A1* | 12/2006 | Chang et al. ............. 323/271 |
| 2007/0182391 | A1* | 8/2007 | Chapuis et al. .......... 323/282 |
| 2008/0037297 | A1* | 2/2008 | Torre et al. ................ 363/41 |
| 2008/0048715 | A1 | 2/2008 | Balasubramanian et al. |
| 2008/0061822 | A1 | 3/2008 | Balasubramanian et al. |
| 2008/0094101 | A1 | 4/2008 | Balasubramanian et al. |
| 2008/0238387 | A1* | 10/2008 | Schmeller et al. ........ 323/282 |
| 2009/0128186 | A1 | 5/2009 | Balasubramanian et al. |
| 2009/0230930 | A1* | 9/2009 | Jain et al. ................. 323/234 |
| 2010/0001760 | A1 | 1/2010 | Balasubramanian et al. |
| 2010/0308654 | A1* | 12/2010 | Chen .......................... 307/31 |

OTHER PUBLICATIONS

"Low Noise, 90 MHz Variable-Gain Amplifier AD603"; 1995; 16 pages; Analog Devices, Inc.; Norwood, MA, USA.

"MOS Integrated Circuit µPD720114 ECOUSB Series USB 2.0 Hub Controller Data Sheet"; Nov. 2005; 32 pages; NEC Electronics Corporation; Japan; retrieved from Internet: http://www.datasheetcatalog.org/datasheets2/30/307636_1.pdf.

"L5953 Multiple Switching Voltage Regulator Product Preview"; Sep. 2003; STMicroelectronics; retrieved from Internet: http://www.datasheetcatalog.org/datasheet2/1/02c2erclj04akk69iwzl3f01jkky.pdf.

"LP2950/LP2951 Series of Adjustable Micropower Voltage Regulators"; Jun. 17, 2009; 26 pages; National Semiconductor.

"LTC3025 300mA Micropower VLDO Linear Regulator"; 2004; 12 pages; Linear Technology Corporation; Milpitas, CA, USA; retrieved from Internet: http://cds.linear.com/docs/Datasheet/3025fd.pdf.

* cited by examiner

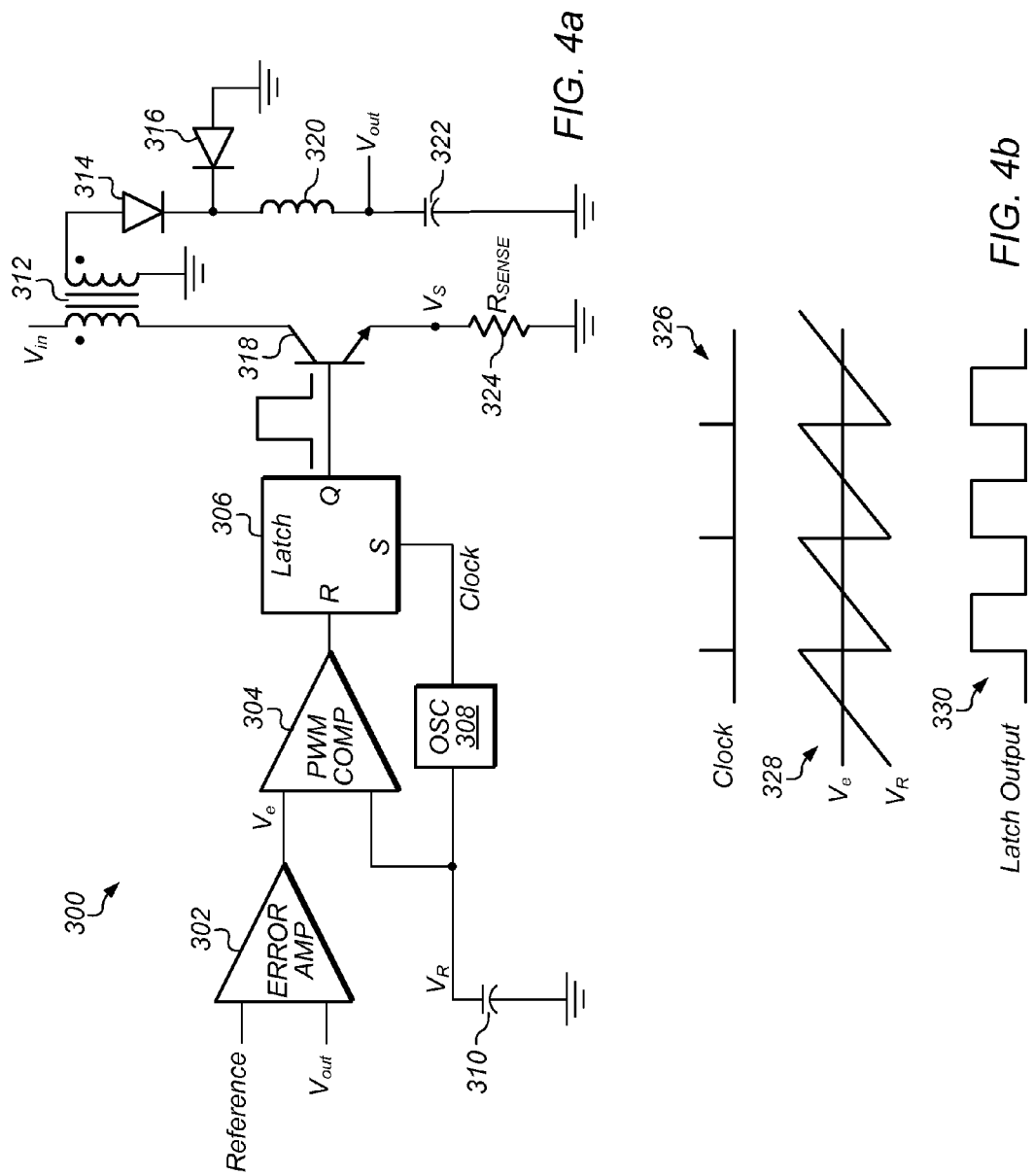

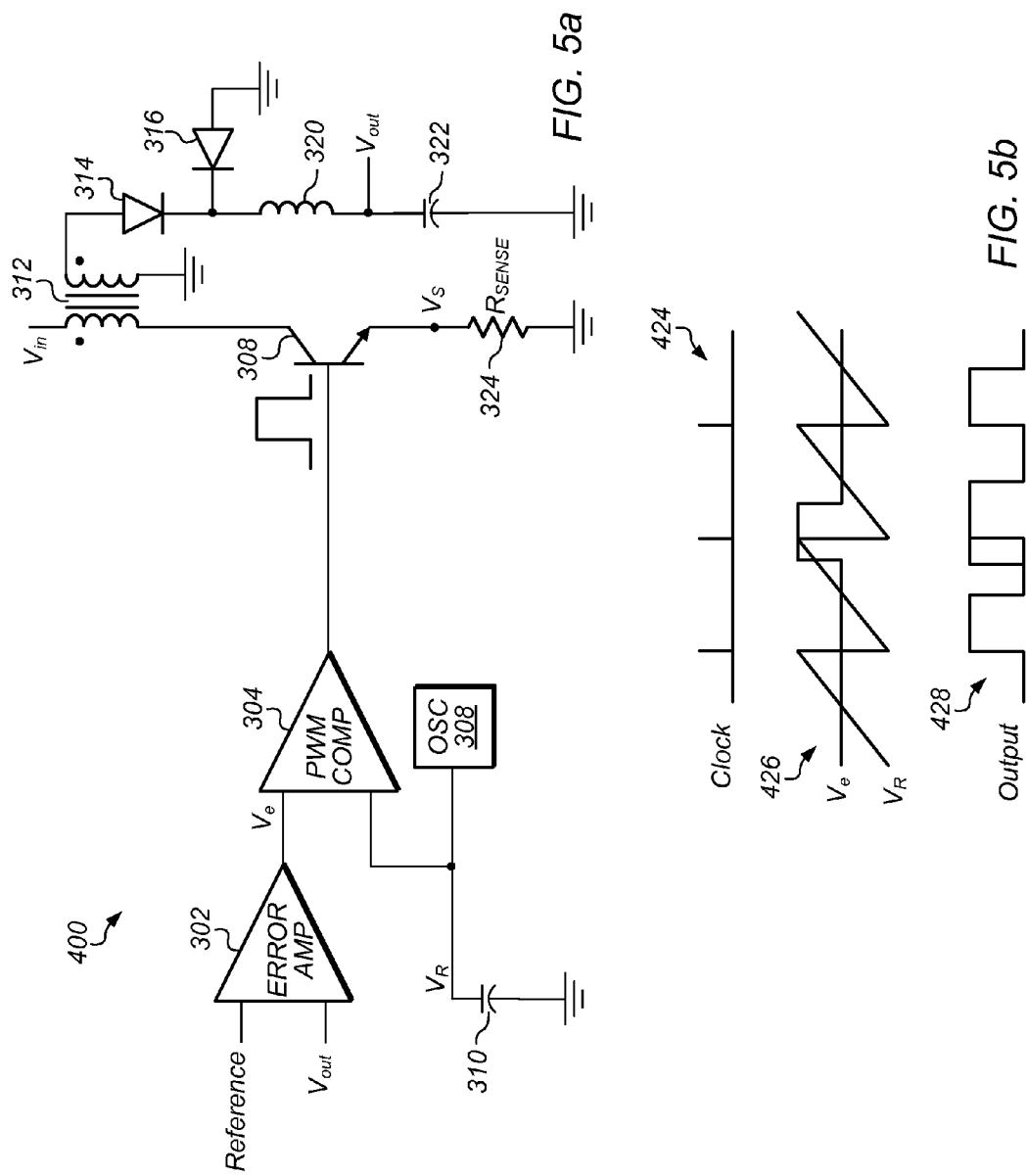

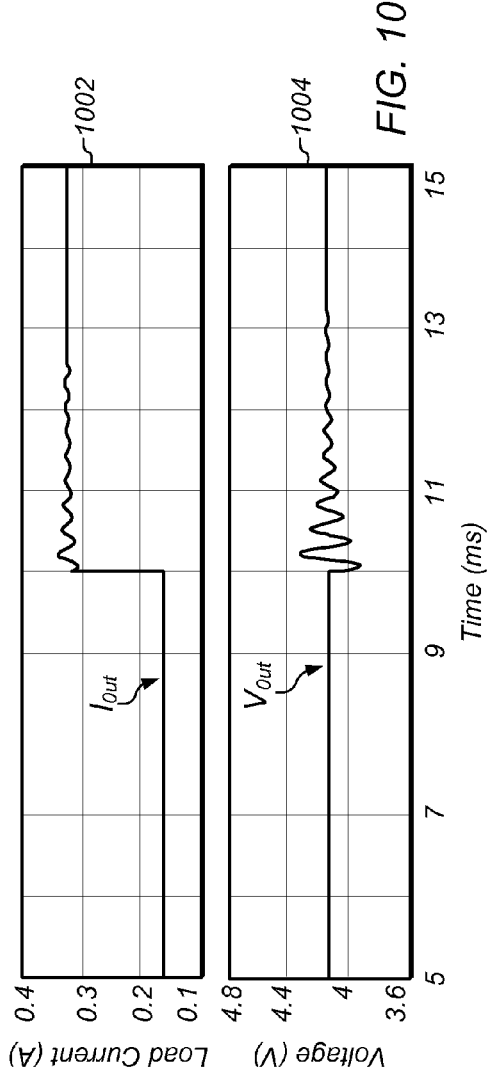
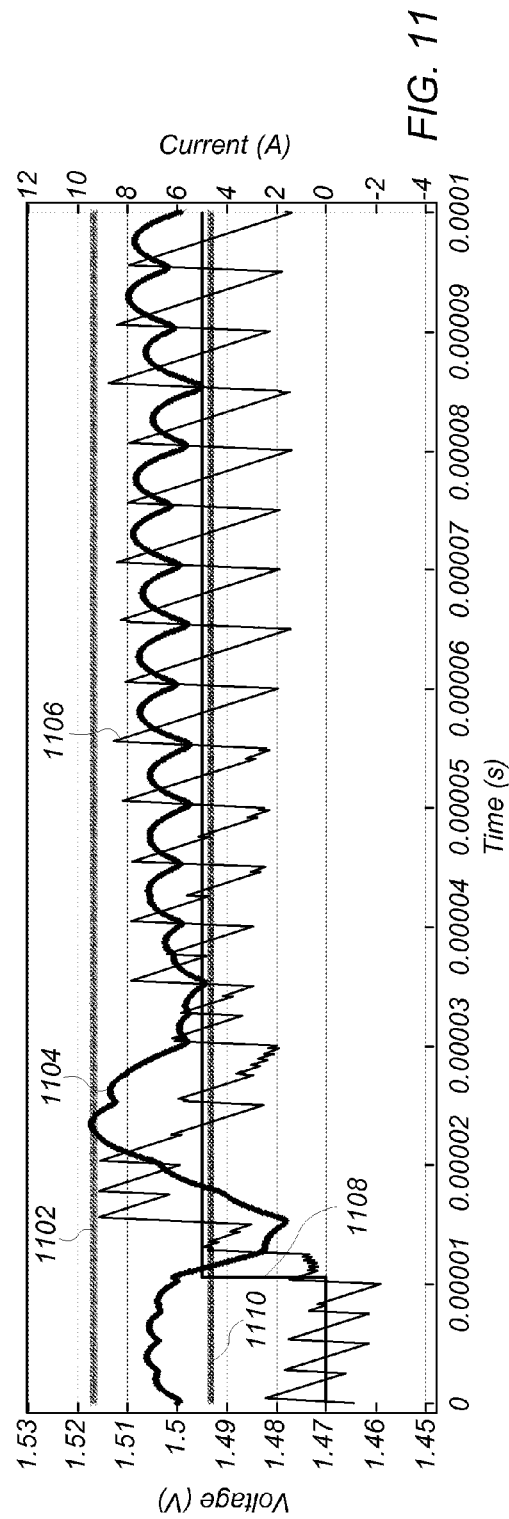

US 8,575,910 B2

SINGLE-CYCLE CHARGE REGULATOR FOR DIGITAL CONTROL

PRIORITY DATA

This application claims benefit of priority of U.S. Provisional Patent Application Ser. No. 61/296,694 titled "Single Cycle Charge Regulator for Power Converters", filed on Jan. 20, 2010, whose inventor is Chris M. Young, and which is hereby incorporated by reference as though fully and completely set forth herein.

FIELD OF THE INVENTION

This invention relates to regulating systems and, more particularly, to a single-cycle charge control method for regulating the systems.

BRIEF DESCRIPTION OF THE DRAWINGS

FIG. 4a shows a circuit diagram of one embodiment of a circuit for performing single-edge modulation control of a power converter;

FIG. 4b shows the behavior of the clock signal, the error voltage, the reference voltage, and the latch output of the circuit of FIG. 4a;

FIG. 5a a circuit diagram of one embodiment of a circuit for performing dual-edge modulation control of a power converter;

FIG. 5b shows the behavior of the clock signal, the error voltage, the reference voltage, and the voltage output of the circuit of FIG. 5a;

FIG. 6a shows the behavior of the integrator voltage and the reference voltage of the circuit of FIG. 4a;

FIG. 6b shows the behavior of the integrator voltage and the reference voltage of the circuit of FIG. 5a;

FIG. 10 shows the behavior of the load current and output voltage for single-cycle correction;

FIG. 11 shows the relationship between the output voltage and output current for single-cycle correction;

Figure 1:
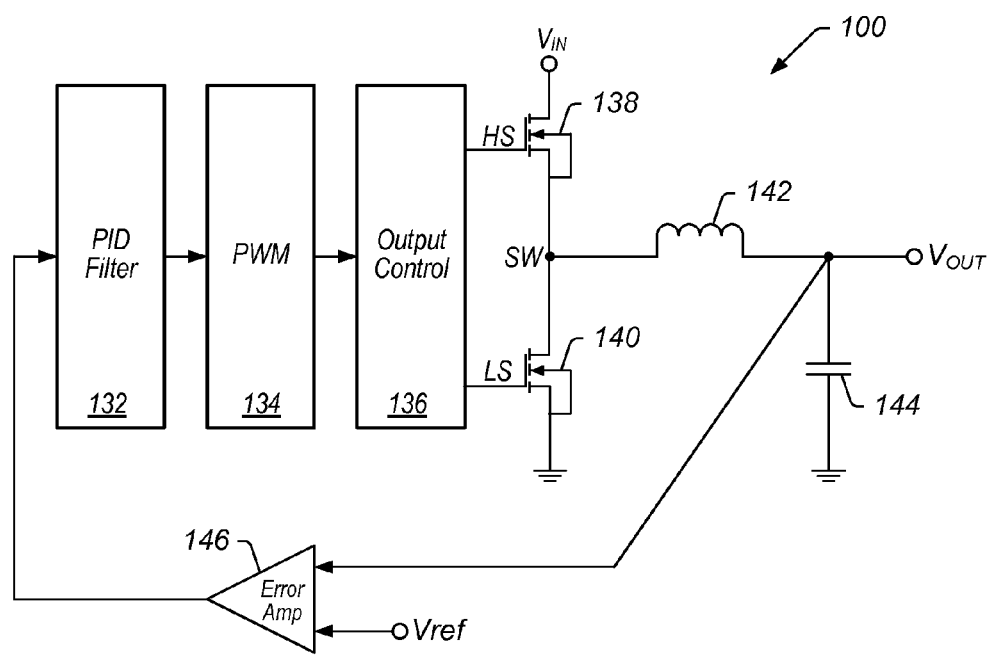
FIG. 1 shows the circuit diagram of one embodiment of a power converter also known as a buck-converter.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

DC-to-DC voltage conversion is often performed by switching voltage regulators, or step-down regulators, also referred to as voltage converters or point-of-load (POL) regulators/converters, converting a higher voltage (e.g. 12V) to a lower value as required by one or more load devices. More generally, voltage regulators and current regulators are commonly referred to as power converters, and as used herein, the term power converter is meant to encompass all such devices. A common architecture features distribution of the higher voltage to multiple voltage regulators, each producing a different (or possibly the same) voltage to one or more loads. Switching voltage regulators often use two or more power transistors to convert energy at one voltage to another voltage. One common example of such a voltage regulator 100, commonly called a "Buck Regulator" is shown in FIG. 1. Buck Regulator 100 typically switches a pair of power transistors (138 and 140) in order to produce a square-wave at the transistors' common node SW. The produced square-wave can be smoothed out using an LC circuit comprising inductor 142 and capacitor 144 to produce the desired voltage, $V_{out}$. A control loop, comprised of an Error Amplifier 146, a Proportional-Integral-Differential (PID) Filter 132, a Pulse-Width-Modulator (PWM) 134, and an Output Control circuit 136, can be configured to control the duty-cycle of the output square-wave, and hence the resulting value of $V_{out}$.

Voltage regulators, such as voltage regulator 100 shown in FIG. 1, for example, usually include a mechanism for recovering from transient output voltage deviations. These short-term voltage deviations may be caused by a variety of control loop disturbances, such as target reference voltage changes, input bus voltage steps, load current transients, and other events that may cause the output voltage to deviate from its intended nominal value. Typically, signal-processing circuitry in the control loop of the voltage regulator (including output control 136) processes these voltage deviations. The recovery process implemented by the control loop is relatively slow, however. Overall, the factors most often considered in the design of reliable voltage regulators include transient response, stability of the output over a wide range, ease of use, and cost.

In order to obtain specifically desired system performance, it is therefore also necessary to compensate the voltage regulator (or, more generally a power converter or a system with at least one controlled output) to recover from transient output voltage deviations. Compensation, however, is oftentimes difficult to implement. In many cases it is preferable to design controlled systems (e.g. voltage regulators) that do not require compensation. Many applications require a transient response along with a high bandwidth response. For example, conventional regulators that use voltage-mode control, e.g. voltage-mode PWM control (e.g. as shown in FIG. 1) typically require compensation. Current-mode control mechanisms require less compensation, but require compensation nonetheless. In addition, current-mode control can easily make the system more sensitive to noise that is oftentimes introduced during the current measurement process. While hysteretic control modes require very little or no compensation, they lack constant frequency, a feature that is an important requirement in certain applications, for example in telecommunications applications. Furthermore, hysteretic control is difficult to synchronize in multiphase applications.

Figure 2:
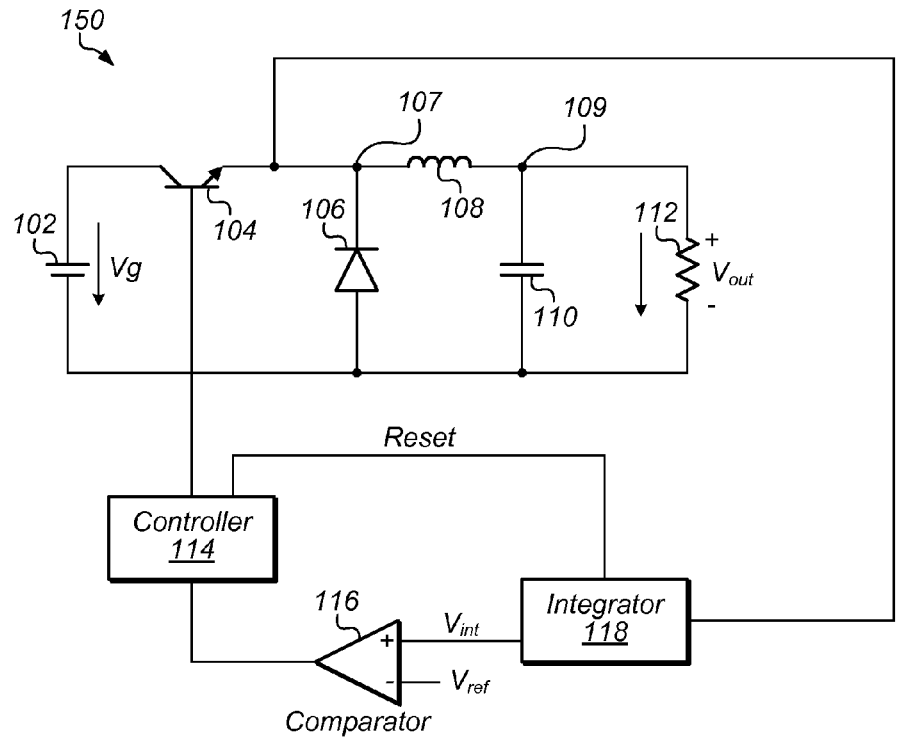
FIG. 2 shows one example of analog one-cycle control of a power converter.

In one set of embodiments, a voltage regulator may be operated at a constant switching frequency, and may have a fast transient response without requiring current measurement for regulation, and without requiring compensation. One approach to compensation-free power supplies is one-cycle (or single-cycle) control. An example of how one-cycle control can be implemented for a voltage converter/regulator providing an output voltage $V_{out}$ is shown in FIG. 2. An input voltage Vg from source 102 is applied to the collector of bipolar junction transistor (BJT) 104. BJT 104 is used with diode 106 to develop a voltage at node 107. A control circuit that includes integrator 118 (receiving the voltage developed at node 107), comparator 116, and controller 114 is used for switching BJT 104 on an off to affect the voltage developed at node 107. The resulting waveform at node 107 is smoothed out by an LC filter that includes inductor 107 and output capacitor 110. The output voltage $V_{out}$ is thereby developed at node 109 based on the voltage at node 107, resulting in a current conducted by inductor 108 and resistor 112. Under steady-state condition, the load current conducted by load resistor 112 will track the average inductor current conducted by inductor/coil 108. However, during and at least for some time period following a transient event on the output, (or on the output voltage) of the regulator at node 109, the load current will fail to track the average inductor current, until reaching steady-state condition again. As mentioned above, a transient event in this sense may refer to transient deviations, or short-term voltage deviations on the output voltage, which may be caused by a variety of control loop disturbances, such as a change in the target reference voltage, input bus voltage steps, current transients caused by load changes, and other events that may cause the output voltage to deviate from its intended nominal value.

Figure 3:
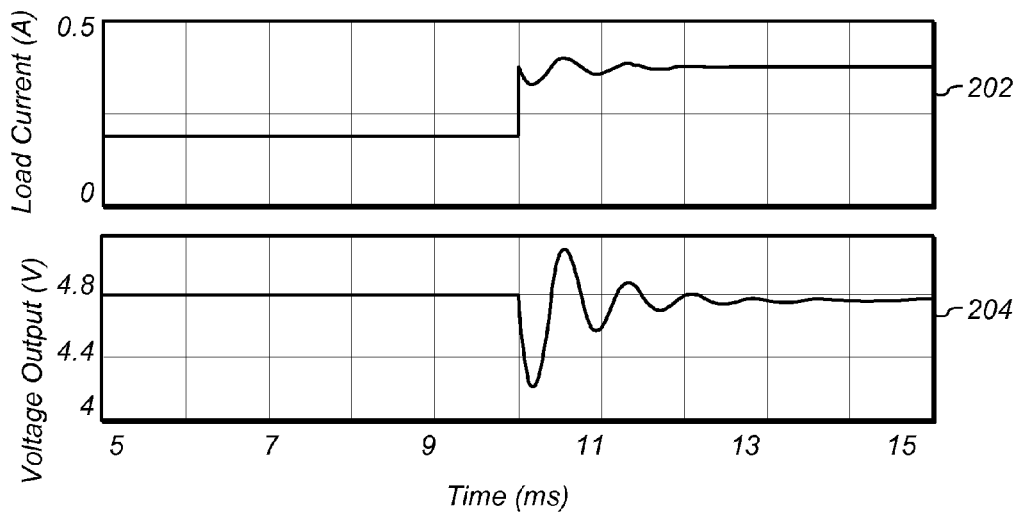
FIG. 3 shows the behaviour of the voltage output and the load current of the circuit of FIG. 2 in response to a transient.

The control mechanism exemplified in circuit 150 is non-linear and may be used in compensation-free power supplies. However, the output transient response exhibited by the output voltage $V_{out}$ in circuit 150 is in many cases not satisfactory. In circuit 150, the transient change in duty-cycle (i.e. the change in duty-cycle in response to a transient event) needed to regulate to the reference voltage $V_{ref}$ may be achieved in one cycle. Circuit 150 can be operated at a constant frequency, exhibits stable operation (though it may not exhibit a satisfactory transient response), is of low complexity, and while it features very good line disturbance rejection, it provides unsatisfactory load disturbance rejection. Load disturbance may refer to a disturbance resulting from a change in or to the load powered by the regulator. The voltage diagram and current diagram in FIG. 3 illustrate the output voltage response 204 and load current response 202 (for the current developed in resistor 112) respectively, to a transient event. As seen in the voltage diagram of FIG. 3, the voltage waveform 204 is indicative of an undesirable output voltage response.

The output voltage $V_{out}$ of the regulator/converter in circuit 150 may be the average value of the switched variable, that is, the diode (rectifier) voltage (across diode 106), in steady-state, if there are no resistive elements between the diode voltage (i.e. the voltage across diode 106) and the output voltage $V_{out}$. In this case there may be a droop proportional to current, and some ripple. However, the output voltage will not be the average value of the switched variable for a load transient case (i.e. the case when the transient even is caused by a change/disturbance caused by a load). The output filter may actually impact the output voltage, requiring an output feedback loop to be implemented.

Ideally, dual edge modulation may work best for a fast transient response. However, the one-cycle control illustrated in circuit 150 in FIG. 2 does not feature dual edge modulation. The possibility of dual edge modulation may be considered in the context of conventional PWM control and one-cycle control. However, instead of a feedback loop in the conventional sense (i.e. in the frequency domain), solutions may be sought for correcting the output voltage in a single-cycle in the time domain, while taking into consideration that single-cycle control introduces the issue of bandwidth. In other words, employing single-cycle control requires taking into consideration the ideal bandwidth for any given regulator. For example, if the bandwidth is too high, and attempts are made to correct noise, too much power may be dissipated in switching. If the bandwidth is too low, the size of the capacitor bank may increase, resulting in degradation of the transient response, and increased cost.

One example of single-edge modulation is shown in FIG. 4a, with corresponding waveforms illustrated in FIG. 4b. The output of regulator circuit 300 is generated from input voltage $V_{in}$ via transformer element 312, which has an input branch coupled to a bipolar junction transistor (BJT) 318 having a sense resistor 324 coupling the emitter of BJT 318 to ground. The output branch of transformer element 312 is coupled to diodes 314 and 316, inducing a current in coil/inductor 320, the output $V_{out}$ appearing at one end of output capacitor 322. A load that may be coupled to $V_{out}$ is not shown in the example provided in FIG. 4a. As part of regulating $V_{out}$, the rising edge of the clock signal from oscillator 308 may set the output of latch 306 high. The leading edge of the output of latch 306 may be controlled only by the clock signal provided to the Set terminal of latch 306 by oscillator 308, and would therefore not be modulated. When the ramp voltage $V_R$ from capacitor 310 exceeds the error voltage $V_e$ generated by error amplifier 302 (based on a reference signal and the output voltage $V_{out}$, fed back to amplifier 302), latch 306 may be reset by the output of comparator 304. The falling edge may be modulated according to the error voltage $V_e$. Once latch 306 is reset, the output $V_{out}$ may only go high on the clock signal until the next clock cycle. If the error voltage $V_e$ exceeds the ramp voltage $V_R$ during a clock cycle, the output of latch 306 may become unresponsive. Therefore, the configuration shown in FIG. 4a may not be suitable for single-cycle correction. Overall, in the configuration of circuit 300 shown in FIG. 4a, the load may be detected through a change in $V_{out}$, without taking current measurements. Consequently, dual-edge modulation may be required. Dual-edge modulation in circuit 300 of FIG. 4a may be achieved by removing latch 306 and reversing the polarity of the input of PWM comparator 304, as shown in FIG. 5a. The corresponding waveforms are illustrated in FIG. 5b. In this case, the clock may simply reset the ramp voltage $V_R$. PWM comparator 304 may now require hysteresis to prevent it from chattering in the absence of latch 306.

Figure 6A:
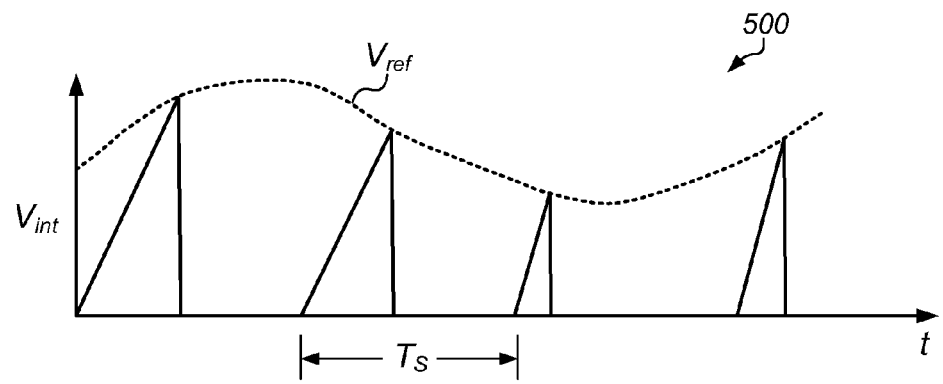
Figure 6B:
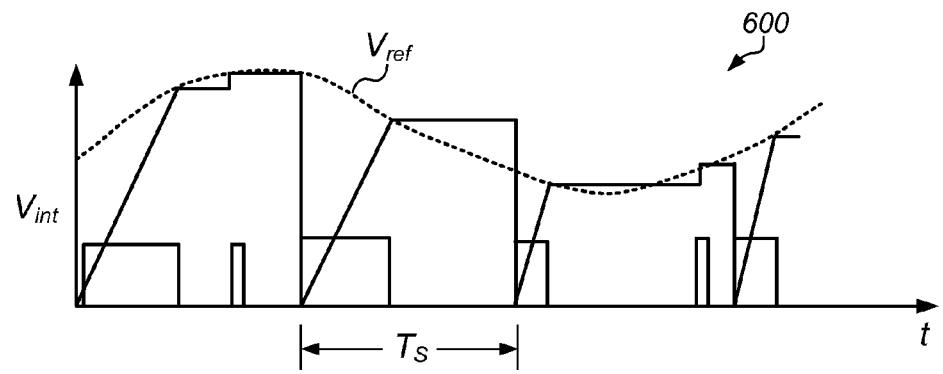
Figure 7:
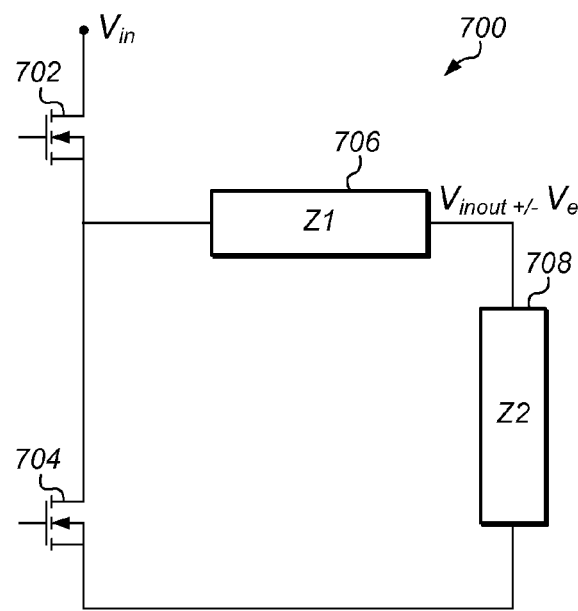
FIG. 7 shows one embodiment of a load structure coupled to the output of a power converter.

Referring again to FIG. 2, integrator 118 may be reset whenever comparator 116 trips. If the reference voltage $V_{ref}$ continues to rise, the output may not turn on again until the clock unlocks integrator 118, as illustrated by waveform 500 shown in FIG. 6a. If integrator 118 is not reset until the clock edge, as illustrated by waveform 600 shown in FIG. 6b, dual edge modulation may be achieved. The manner in which the voltage is corrected in a single cycle may depend on the transient properties of Z1 706 and Z2 708 of the load configuration 700 shown in FIG. 7, in the context of transistors 702 and 704 representing the output stage of the voltage regulator (for example transistor devices 138 and 140, respectively, of regulator 100 in FIG. 1). If Z2 708 is a resistor, then current may need to change by $V_e/Z2$. If Z2 708 is a capacitor, the charge delivered by the inductor may need to change by $V_e*C$, and the current may need to change to match the current required by the load.

Figure 8:
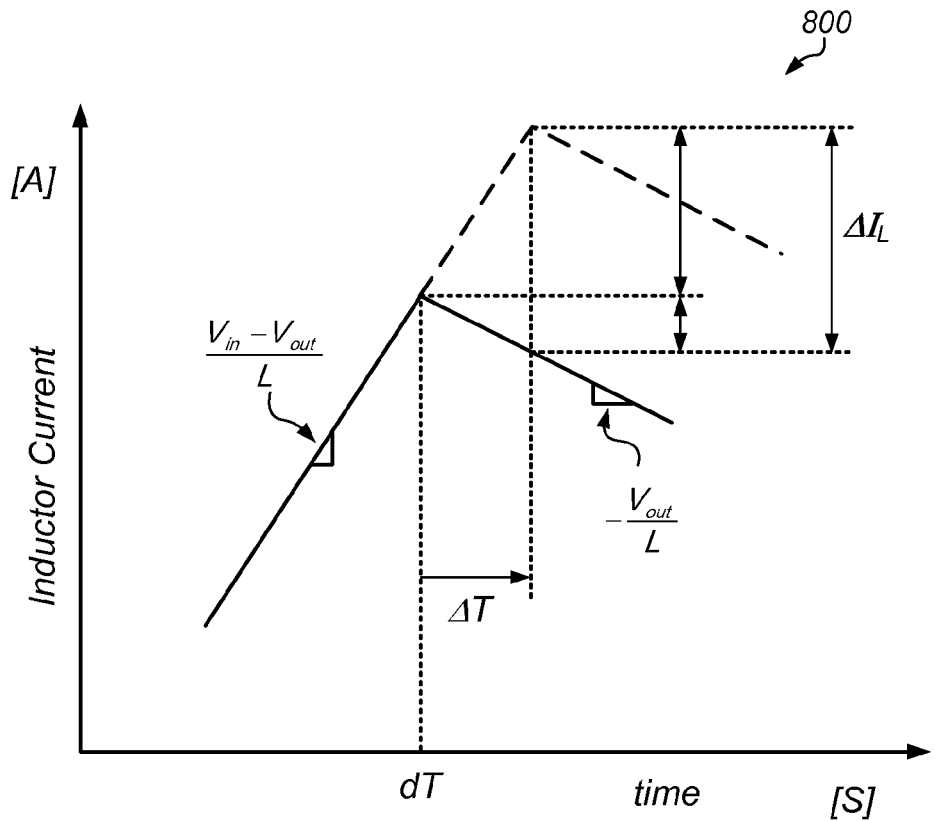
FIG. 8 shows the behavior of the inductor current when the current is corrected in a single cycle for a resistive value of Z2 of the load structure of FIG. 7.

The output current may be corrected in a single cycle using analog circuitry with Z2 708 implemented as either a resistor or a capacitor. FIG. 10 shows the behavior of a load current $I_{out}$ 1002 and output voltage $V_{out}$ 1004 for single-cycle correction. Single-cycle current control may be achieved by a single-cycle adjustment of the duty-cycle from the steady-state value to a new value incremented by a value proportional to the error voltage, as indicated in the following equations, and illustrated in the inductor current diagram 800 shown in FIG. 8.

$$\Delta I_L = \left[ \frac{V_{in} - V_{out}}{L} + \frac{V_{out}}{L} \right] \cdot \Delta T = \frac{V_{in} \cdot T}{L} \cdot d \quad (1)$$

$$\Delta d = \frac{L \cdot f}{V_{in} \cdot Z2} \cdot V_e, \quad (2)$$

where '$I_L$' represents the inductor current, 'T' represents one switching period or cycle, 'd' represents the steady-state duty-cycle, '$V_{in}$' represents the input voltage, '$V_e$' represents the error voltage on the output, and '$\Delta d$' represents the change in duty-cycle.

Figure 9:
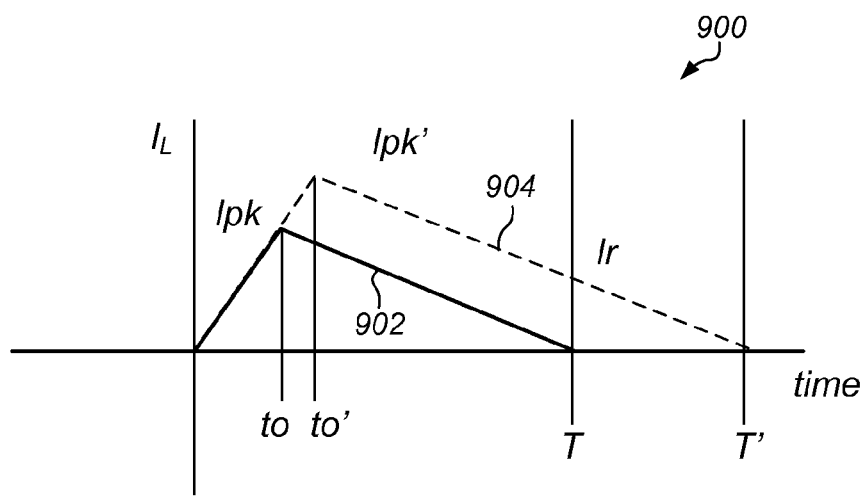
FIG. 9 shows the relationship between duty-cycle value and the output current when the current is corrected in a single cycle for a capacitive value of Z2 of the load structure of FIG. 7.

Single-cycle charge control may also be achieved with Z2 708 implemented as a capacitor, by adjusting the overall duty-cycle from the steady-state value to a new value incremented by a value proportional to the error voltage, in a single cycle. This is indicated in the following equations, and illustrated in the inductor current ($I_L$) in diagram 900 shown in FIG. 9.

$$\Delta Q_o = \frac{V_{in} - V_{out}}{L \cdot f^2} \cdot \Delta d \cdot \left[ 1 - \frac{\Delta d}{2 \cdot (1 - d_o)} \right] \quad (3)$$

$$\Delta d \approx \frac{L \cdot C \cdot f^2}{V_{in} - V_{out}} \cdot Ve, \quad (4)$$

where $\Delta Q_O$ represents the change in electrical charge at the output. $V_{out}$ and $V_{in}$ represent steady-state values. A more detailed example of a transient response when employing single-cycle charge control is shown in FIG. 11. As shown in FIG. 11, waveform 1104 represents the output voltage, waveform 1102 represents the maximum deviation, waveform 1110 represents the minimum deviation, waveform 1108 represents the load current, and waveform 1106 represents the inductor current. As seen in FIG. 11, the approach to single cycle (or one cycle) control described above does not appear to provide satisfactory results in response to transient events.

One of the reasons for the unsatisfactory response is the fact that the impact of the control operations performed in one cycle may not generally be limited to that one cycle. In other words, even though a given control operation may only be active during a single cycle, the impact of that control operation may affect the behaviour of the output voltage and/or load current in one or more subsequent cycles. For example, for a 5 A load step, the output voltage may drop to some value, which may result in the controller adjusting the duty-cycle to remove the voltage drop. However, it may not be possible to precisely determine the required current increase (shift in the duty-cycle) to recover the voltage. If the current is shifted to match the load current, there may still be a charge deficiency in the output capacitor (e.g. capacitor 322 in FIGS. 4a and 5a). Any other value may also not result in the correct steady-state current, requiring an eventual shift of the current to the final value over steady-state corrections taking place during switching cycles subsequent to the cycle during which the transient event occurred.

If the charge were replaced in a single switching cycle so that the voltage is recovered in one switching cycle, the current, in general, may not be at the steady-state value at the end of the switching cycle, and may thus need to be adjusted again. In other words, by adjusting the output voltage in response to the transient event, the load current at the end of the switching cycle—in which the correction took place—will not reside at the same level, or within a specified (small) percentage of the level where at which it was residing prior to the transient event. This in turn may cause the output voltage to still deviate from its desired nominal (regulated) value, and the output voltage may therefore need to be adjusted again until the value of the output voltage is again within at least a specific percentage of the desired nominal value, or at the nominal value. Thus, by returning the load current by the end of the correction cycle to the value where it resided prior to the transient event, further regulation of the output voltage in response to that transient event may not be required. That is, no residual correction may need to be performed stemming from the transient event. In a general case, the steady-state inductor current may be different from the load current, and consequently, as may be expected, the voltage may begin to deviate. However, the arbitrary state of the inductor current and the voltage deviation that it causes may be eliminated. To put it another way, in response to a voltage deviation, the conventional approach may be to try and correct the voltage while leaving the current in an arbitrary state. In various embodiments described herein, the voltage is corrected (thereby returning the voltage into its regulated state by the end of the transient correction), while the current is restored to its previous, and presumably non-arbitrary, state.

Figure 12:
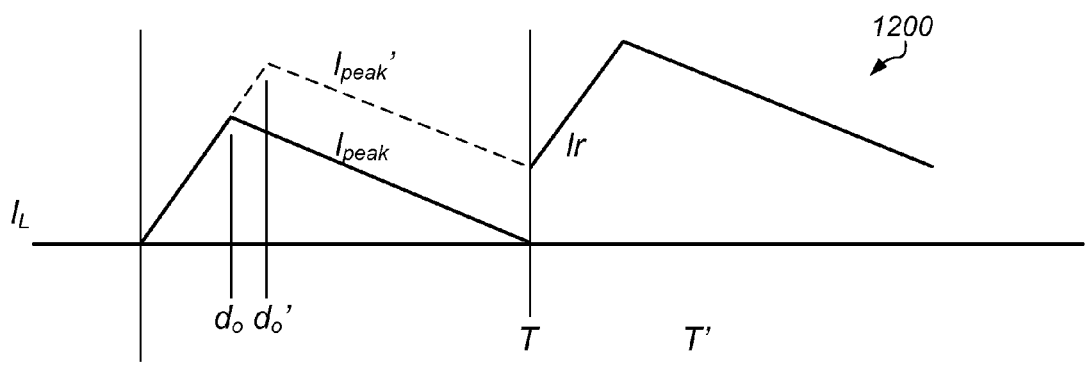
FIG. 12 shows the relationship between duty-cycle value and the output current when the current is corrected in a single cycle according to prior art methods.

However, it may not be possible to determine in one cycle what the preferred steady-state value of the inductor current ought to be. At least two of the state variables may need to be considered: output voltage and inductor current. While the output voltage may be a known entity, the "real" value of inductor current may not be known. The relationship between the inductor current and output voltage may be unknown when the load current is unknown. The original single-cycle approach is illustrated in FIG. 12 via current diagram 1200 showing the behaviour of the inductor current $I_L$, indicating unsatisfactory results. As shown in FIG. 12, the duty-cycle may be adjusted ($d_o$ represents the steady-state duty-cycle, while $d_o'$ represents the adjusted duty-cycle) to deliver the charge/current to restore the voltage in one cycle. This approach, however, may not work because the current as the cycle is exited (after time T, at time T') does not match the required value of the current (for the capacitive case) to maintain the desired value of the output voltage.

Figure 13:
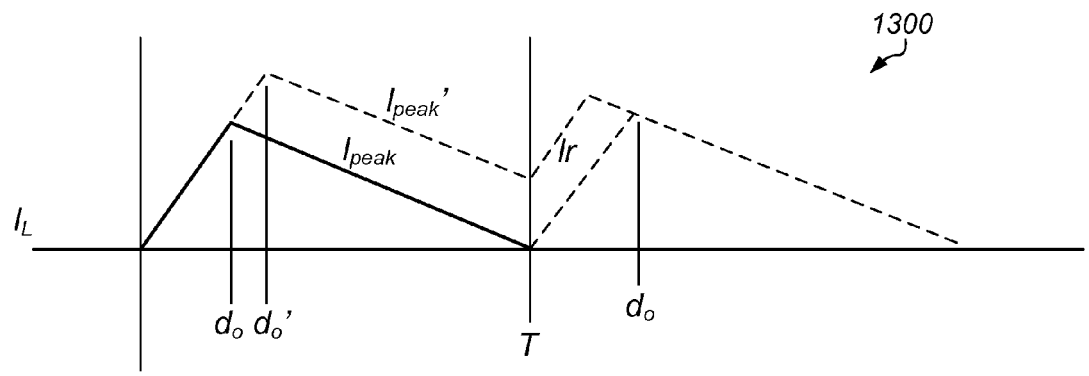
FIG. 13 shows the relationship between duty-cycle value and the output current when the current is corrected in a single cycle according to one embodiment.
Figure 14:
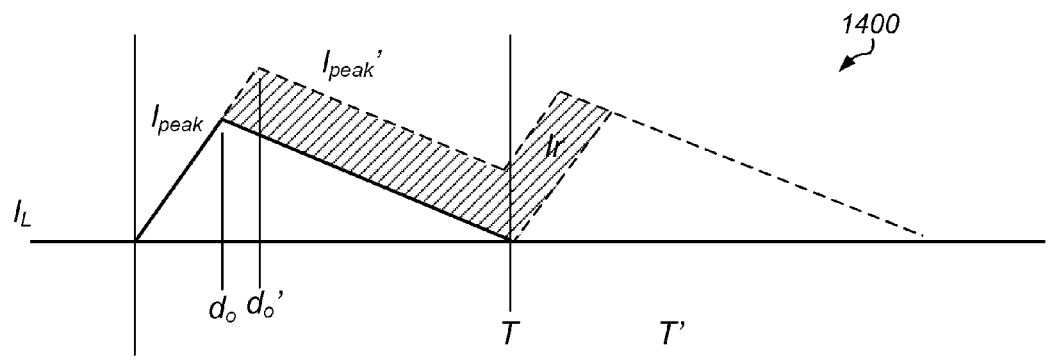
FIG. 14 shows the relationship between duty-cycle value and the output current and the electrical charge at the power converter output when the current is corrected in a single cycle according to one embodiment.
Figure 15:
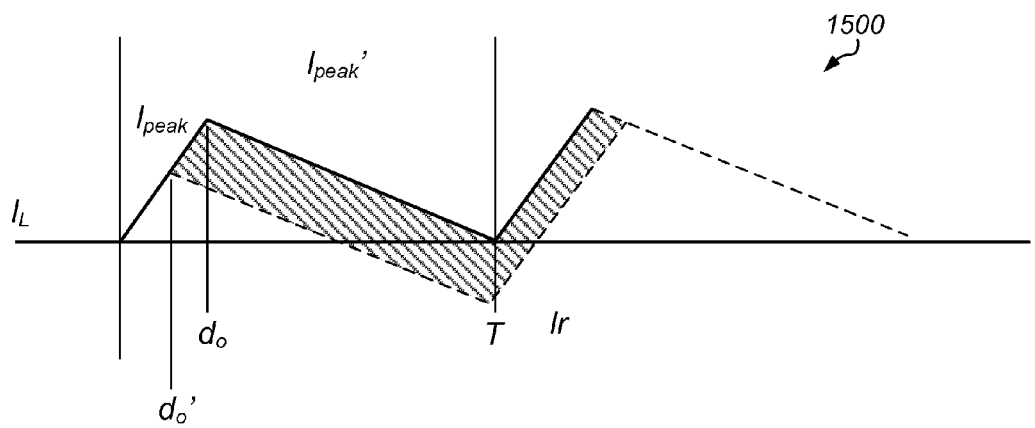
FIG. 15 shows the relationship between duty-cycle value and the output current and the electrical charge at the power converter output when the current is corrected in a single cycle according to another embodiment.

A different, improved approach may include adjusting the duty-cycle to deliver the charge to restore the output voltage, subsequently returning the inductor current, to its original value, that is, returning the inductor current to the value where it was residing prior to the transient event. The potential result of this approach is illustrated via current diagram 1300 in FIG. 13, where the current ($I_L$) returns to its previous value, beyond time point T. In simple terms, if the duty cycle is incremented (decremented) by an amount "$d_o$" in one cycle, it may be decremented (incremented) by the same amount in the next cycle. In some cases, it may not be possible to obtain the desired increment (decrement) amount in a single next cycle. In such cases, the duty cycle may be further adjusted by the remaining portion of the desired decrement (increment) amount during a subsequent cycle(s) following the next cycle. This is performed to restore the inductor current to its original value, that is, the value of the inductor current prior to the duty cycle being incremented (decremented) by "$d_o$". Examples of the effects of charge regulation on the output current are shown in FIGS. 14 and 15. The shaded areas represent the added electrical charge at the output (specifically, on the output capacitor) resulting from the duty-cycle adjustment aimed at adjusting the output voltage in response to a transient event, during a single correction cycle. As seen in FIGS. 14 and 15, the inductor current does not overshoot, in fact it doesn't change except during the single cycle during which the duty-cycle adjustment is made. It should be noted that the regulation scheme discussed herein may be characterized as a voltage regulation scheme. Higher current is invoked during a single cycle and restored to its original value after the voltage deviation has been corrected. A higher average inductor current may be synthesized by invoking a higher inductor current on a cycle by cycle basis. As shown in FIGS. 14 and 15, $d_o$ again represents the steady-state duty-cycle, while $d_o'$ represents the adjusted duty-cycle.

Figure 16:
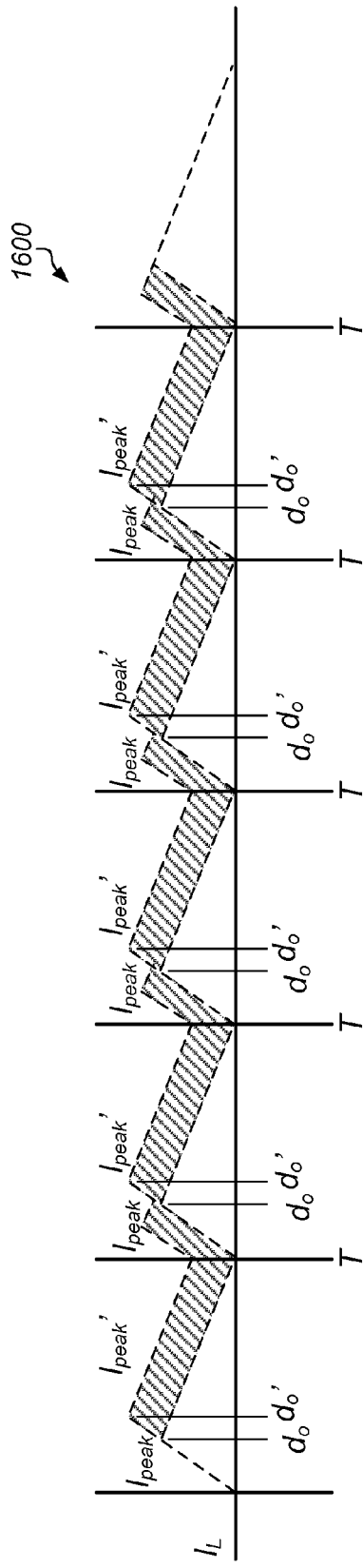
FIG. 16 shows the relationship between duty-cycle value and the output current and the electrical charge at the power converter output with respect to steady-state requirements, when the output current is corrected in a single cycle according to one embodiment.
Figure 17:
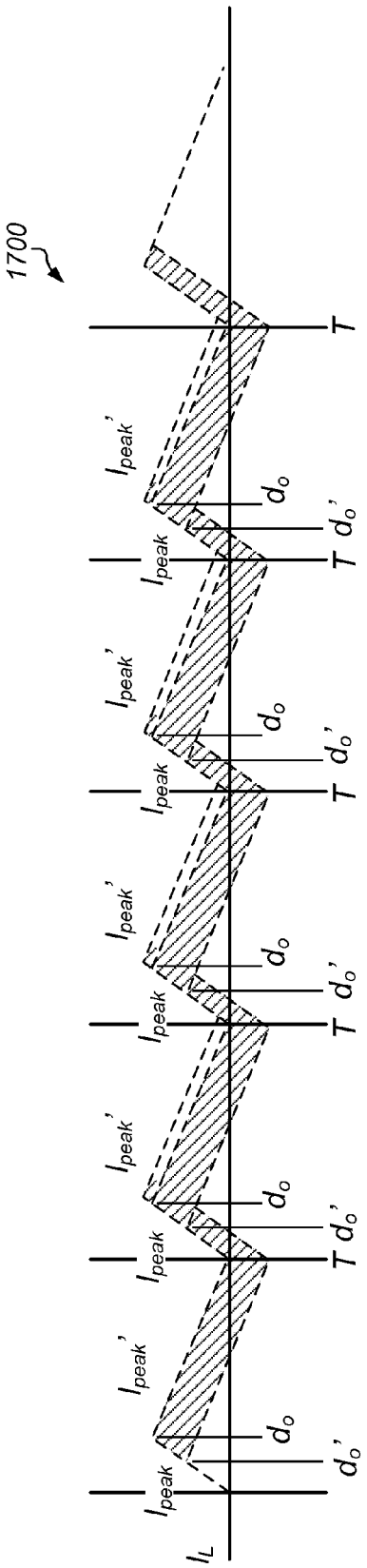
FIG. 17 shows the relationship between duty-cycle value and the output current and the electrical charge at the power converter output with respect to steady-state requirements, when the current is corrected in a single cycle according to another embodiment.

FIGS. 16 and 17 illustrate via current diagrams 1600 and 1700, respectively, how the current may be changed to match the steady-state requirement. If there is a charge correction of Q each cycle, then the average current correction needed may be designated as Qf. Note that the output voltage may in fact be regulated while the inductor current (and consequently the load current) is manipulated/corrected. This may be performed when using a capacitive load or a resistive load. In one set of embodiments, the current may be adjusted until a charge correction does not have to be supplied on each cycle. Since the voltage is regulated on each (switching) cycle, the charge/duty-cycle shift may be filtered/averaged to obtain the required steady-state shift.

Figure 18:
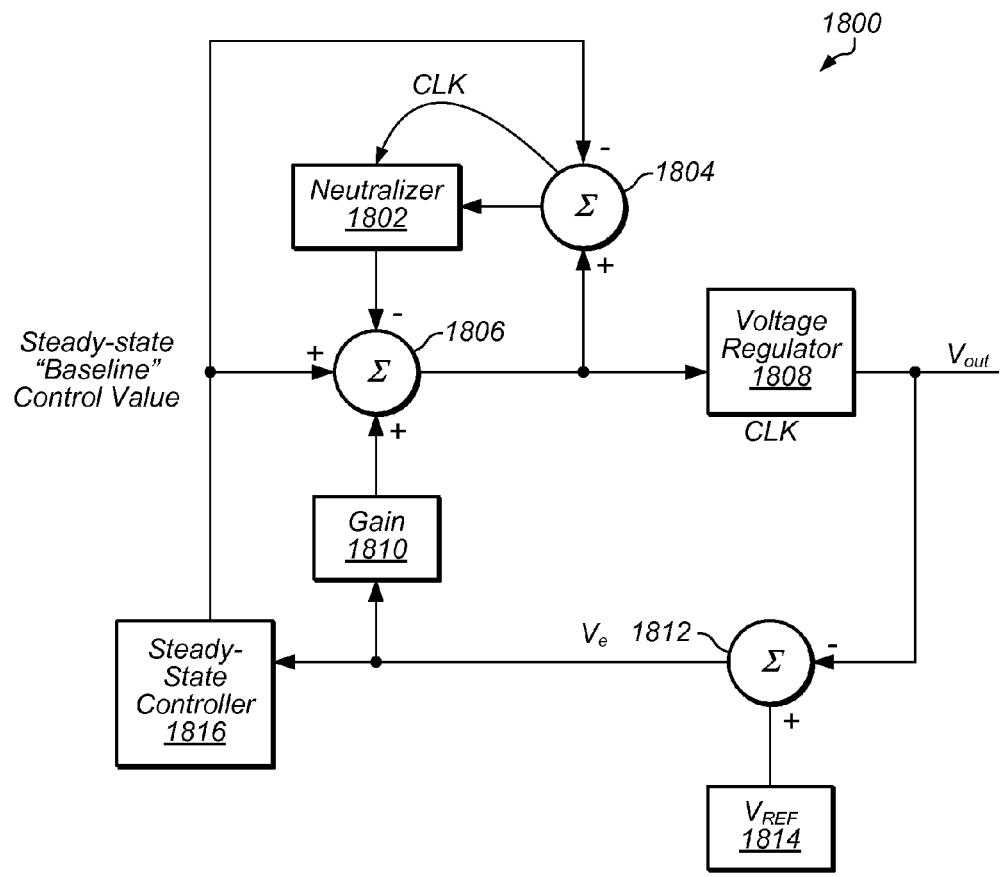
FIG. 18 shows one embodiment of a single-cycle charge control circuit.

FIG. 18 shows the block diagram of one embodiment of a single-cycle charge regulator 1800. Again, as referenced here, the single cycle refers to a single switching cycle of the switching regulator. For example, in case of a regulator controlled via a PWM signal, a single cycle of the PWM signal may be referenced as a single switching cycle. As shown, the error voltage ($V_e$) generated at node 1812—based on the output voltage $V_{out}$ and a reference voltage $V_{ref}$ 1814—may be used in a transient control path ("fast" path) into Gain module 1810, as well as in a steady-state control path ("slow" path) into a steady-state controller 1816, which may be a proportional/integral (PI) controller in some embodiments. The "slow" path is part of the primary control loop to set the steady-state control value for a control signal used in regulating the output of voltage regulator 1808. In one embodiment, the control signal is a PWM signal, and the control value is the duty-cycle value for the PWM signal used in performing PWM control. In other words, while in this case the duty-cycle of a PWM signal is controlled, in alternate embodiments a different parameter may similarly be controlled according to the method of control employed (e.g. Pulse density modulated signal or some different type of control). In any case, the output from node 1806 to regulator 1808 represents the overall value to which the control signal—used in regulating the output voltage $V_{out}$ in regulator 1808—is to be set.

To adjust the charge at the output of the regulator 1808 in response to a transient event, a difference in duty-cycle value (Δd) may be subtracted from the current steady-state duty-cycle value on the cycle subsequent to the cycle during which the correction to the transient event occurs. The target duty-cycle value, or overall duty-cycle value may be obtained by the following equation implemented in the controller of FIG. 18:

$$\text{Target value} = \text{Baseline value} - \text{Neutralizer difference value} + \text{Fast Error Correction value}, \quad (5)$$

where the baseline value is the steady-state duty-cycle value (from steady-state controller 1816), the Neutralizer difference value is the duty-cycle difference value (from Neutralizer 1802), and the Fast Error value is the value to correct for a transient event, and is based on the error voltage $V_e$ and Gain 1810. The new Neutralizer value is then updated using the difference between the output of node 1806—which represents the steady-state duty-cycle value adjusted in response to the transient event—and the baseline steady-state duty-cycle value from the output of steady-state controller 1816, as shown at node 1804. The duty-cycle value of the PWM signal in voltage regulator 1808 may be set/controlled according to the output generated at node 1806. As will be further noted below, the control system shown in FIG. 18 may be implemented in a variety of ways, including analog circuitry (in which case $V_{ref}$ and $V_e$ may be analog voltage values), digital circuitry (in which case $V_{ref}$ and $V_e$ may numeric values representative of corresponding voltages), or a combination of both. In addition, digital circuitry may include application specific circuitry (e.g. one or more application specific integrated circuits), and/or one or more processors, such as a microprocessor and/or microcontroller executing software instructions to perform the operations shown in FIG. 18. It may be worth noting here, that when operating in Continuous Current Mode (CCM), the steady-state duty cycle adjustment may be obtained through a cycle-by-cycle adjustment. For example, at the end of a cycle the voltage may have been corrected, but the correct steady-state duty cycle value may not have been achieved. The voltage may then begin to deviate, and the duty cycle may be adjusted for that cycle to again correct the voltage. If this occurs every cycle, then every cycle may have the new required steady-state duty cycle as illustrated for example in FIGS. 16 and 17. The same holds for operating in Discontinuous Current Mode (DCM) as well.

In one sense, the value/signal from Gain 1810 may be considered a control signal/value generated to control transient response of the output of the regulator, the signal/value from steady-state controller 1816 may be considered a control signal/value generated to control steady-state behavior of the regulator, and the signal/value from neutralizer 1802 may be considered a control signal/value generated to adjust the charge at the output of the regulator to further adjust the response to the transient. Thus, the control signal/value from node 1806 may provide an overall, or target control value to voltage regulator 1808 that results in the inductor current and regulated output voltage remaining substantially at the same respective levels following the cycle during which correction to a transient event occurs, than the levels at which they were residing prior to the transient event taking place. As noted above, the diagram of FIG. 18 illustrates various functional components, which may be implemented in a variety of different ways. For example, those skilled in the art will appreciate that the steady-state controller 1816, gain adjuster 1810, various elements of voltage regulator 1808 (e.g. all the elements shown in FIG. 1, excluding PID Filter 132, an equivalent of which is represented in FIG. 18 as steady-state controller 1816), neutralizer 1802 and the various summing nodes (1812, 1804, 1806) forming control system 1800 may be implemented individually or with some of the functionalities combined as permitted by the configuration of control system 1800, and that functionality of control system 1800 as a whole may be implemented in software, hardware or a combination of both, considering $V_{ref}$ 1814 and $V_{out}$ as inputs to control system 1800. For example, some or all functionality may be captured in a program executed by a processor or microcontroller, or it may be implemented as an application specific integrated circuit, or a combination of the two, depending on the specific implementation requirements of the system itself.

In general, the function inside neutralizer 1802 may be determined according to considerations based on voltage regulator 1808, e.g. operating principles of the voltage regulator, and/or structure of the voltage regulator, etc. Control system 1800 may be configured to provide an input to neutralizer 1802 based on the present target control value at the output of node 1806 and the present steady-state control value at the output of steady-state controller 1816. As shown in FIG. 18, the input to neutralizer 1802 is the difference between the present target control value and the present steady-state control value, which neutralizer 1802 may use to update its value. Neutralizer 1802 may then output the updated neutralizer value to node 1806 to be subtracted from the steady-state control value and the transient control value, to produce the target control value in the subsequent cycle. In one embodiment, neutralizer 1802 updates its value by simply adding the value received at its input to its present value, and outputs the updated neutralizer value. In another embodiment, neutralizer 1802 outputs only a fraction (e.g. 70%) of the updated neutralizer value. In yet other embodiments, the difference between the present steady-state control value and the present target control value may be used as the input into a function configured within neutralizer 1802 to generate the updated neutralizer value according to various considerations dictated by the application, regulator structure, etc. For example, the function may be more than a simple linear gain block, and may possess integral or differential characteristics. Overall, the neutralizer value output by neutralizer 1802 serves to provide additional correction to the target control value such that the inductor current return to its previous value (or at least to within a specified allowed percentage of its previous value, where the previous value is the value of the current prior to the transient event) by the end of the correction cycle, or at least by the end of a specified number of cycles subsequent to the correction cycle (which may be the end of the cycle subsequent to the correction cycle). This may eliminate the need for residual corrections having to be performed due to the transient event, in addition to the correction already performed during the single switching cycle.

Figure 19:
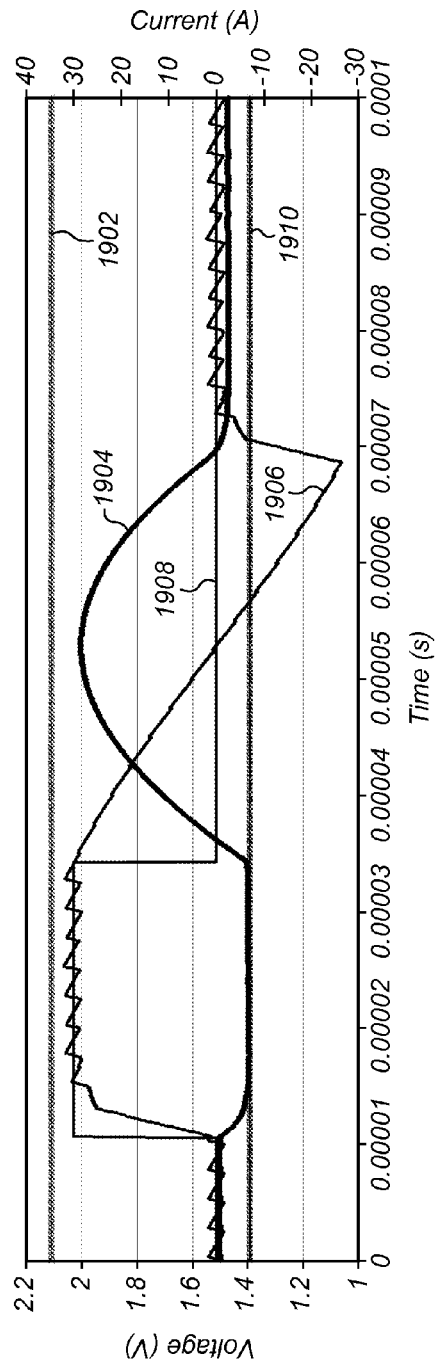
FIG. 19 shows the behavior of the output voltage and output current for the circuit of FIG. 18, according to one embodiment.
Figure 20:
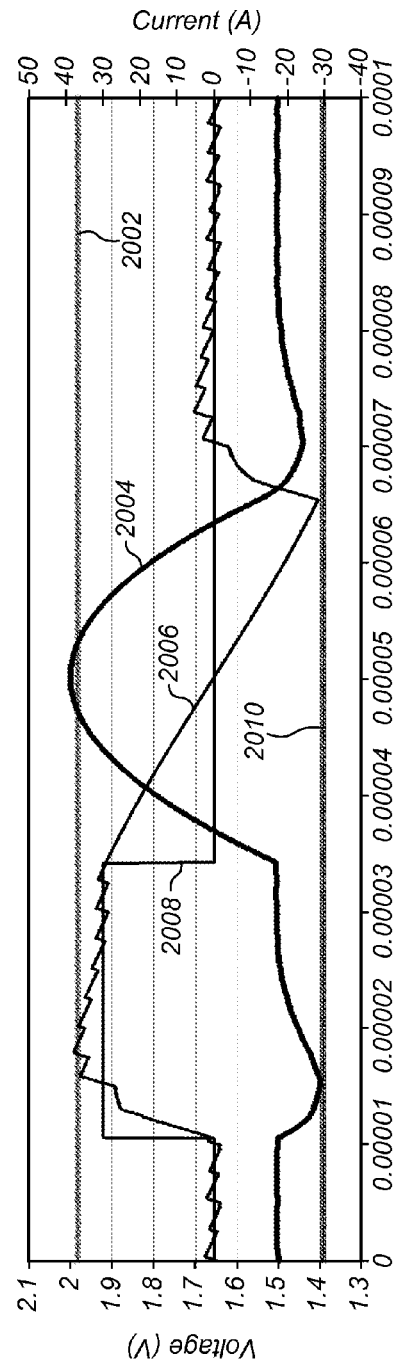
FIG. 20 shows the behavior of the output voltage and output current for the circuit of FIG. 18, with the voltage offset removed.

Model results for the operation of the controller of FIG. 18 are shown in the diagrams of FIG. 19 and FIG. 20. As shown in FIG. 19, waveform 1904 represents the output voltage, waveform 1902 represents the maximum deviation, waveform 1910 represents the minimum deviation, waveform 1908 represents the load current, and waveform 1906 represents the inductor current. The example shown in both FIG. 19 and FIG. 20 is for an input voltage $V_{in}$ of 12V, a nominal (expected) output voltage $V_{out}$ of 1.5V, with a 30 A load step, and without compensation. In other words, a transient event is caused by a load change resulting in a step in the load current as illustrated by waveforms 1908 and 2008, respectively. The result of the 30 A load step is observed in the transient change that appears on output voltage waveforms 1904 and 2004, respectively. In both cases, the output voltage first dips—due to the increase in load current at approximately the 10 μsec mark—then increases due to the drop in load current at approximately the 35 μsec mark. The response in FIG. 19 corresponds to an embodiment in which neutralizer 1802 (from FIG. 18) is outputting an updated neutralizer value representative of a sum of the present neutralizer value and the value input into neutralizer 1802 as shown in FIG. 18. As seen from the dip in $V_{out}$ in FIG. 19, there is a ΔV change of approximately 0.1V, whereupon the output voltage drops from 1.5V down to 1.4V. The voltage offset may, however, be removed, as illustrated in FIG. 20.

Figure 21:
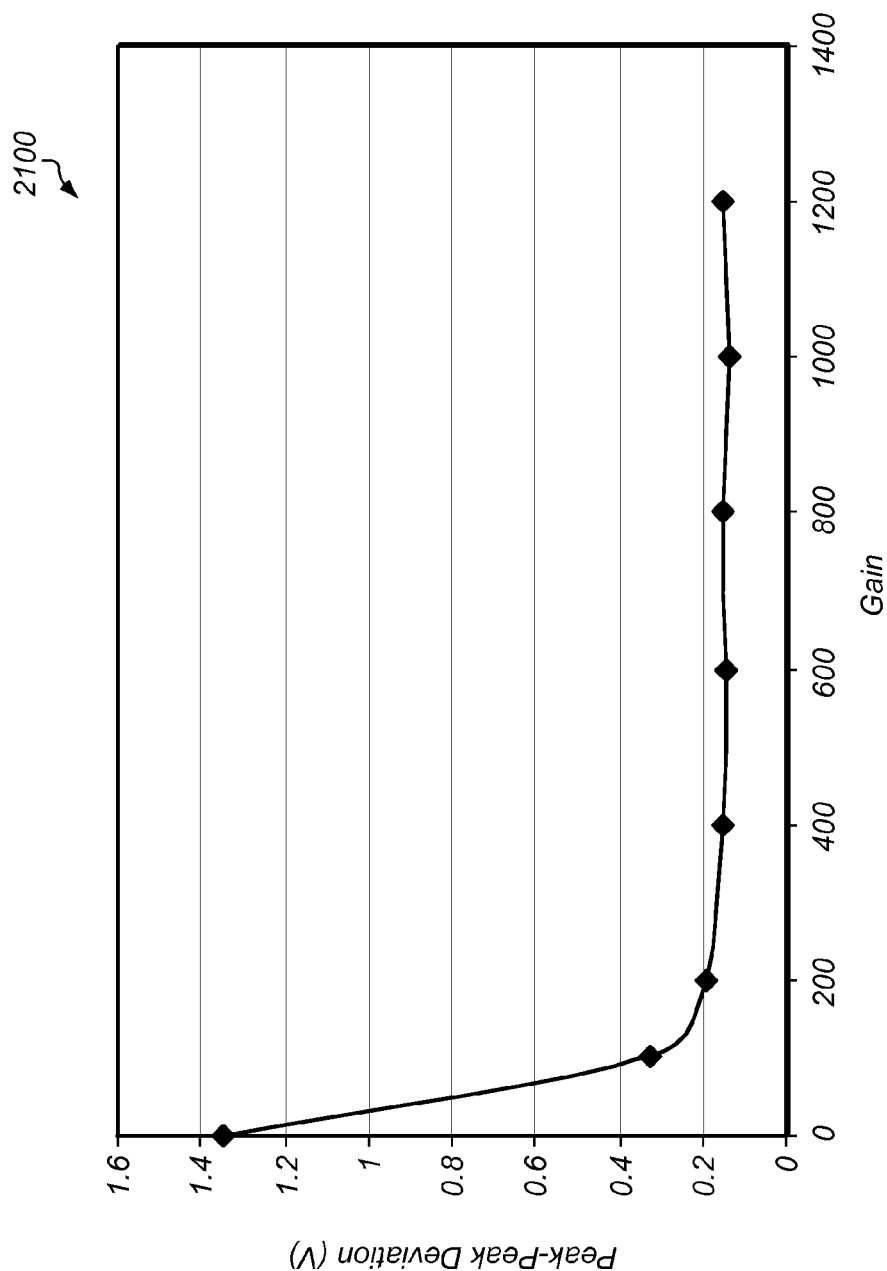
FIG. 21 shows a graph depicting the relationship between the peak-to-peak deviation of the output voltage and the gain.

The response in FIG. 20 corresponds to an embodiment in which neutralizer 1802 is outputting an updated neutralizer value representative of a fraction or percentage (e.g. 70%) of the sum of the present neutralizer value and the value input into neutralizer 1802. As shown in FIG. 20, waveform 2004 represents the output voltage, waveform 2002 represents the maximum theoretical deviation, waveform 2010 represents the minimum theoretical deviation, waveform 2008 represents the load current, and waveform 2006 represents the inductor current. Due to the fact that the current is "neutralized", that is, corrected each cycle, by performing what is essentially a partial correction of the current, the voltage offset may be removed. Thus, instead of the entire difference value of the duty-cycle (Δd), only a portion of Δd (e.g. a specified percentage of Δd) may be subtracted on the next cycle (i.e. the cycle subsequent to the cycle when the transient occurs). Again, as seen in FIG. 20, the voltage briefly dips down to 1.4V, but quickly returns to 1.5V. The diagram shown in FIG. 21 illustrates the sensitivity of the voltage deviation to the gain represented by Gain module 1810. As shown in FIG. 21, the peak-to-peak deviation remains essentially constant for any gain value greater than or equal to approximately 200. Thus, if the gain is chosen somewhere in the range between 100 and 1200 (of the values shown), $V_{out}$ would remain unaffected by the gain. It should be noted that the results presented in the analysis above may be different for various embodiments and implementations, dependent on the specifics of the implementation and the respective values of the various components. The above analysis is simply meant to illustrate a system and method for obtaining embodiments that are not sensitive to the gain value.

It may also be worth noting that limiting the bandwidth of Gain module 1810 may aid in keeping the control from tripping on "noise spikes". Even when the spikes are removed, the ripple in the waveform may result in a variable error within a cycle. A possible solution may include use of first order IIR (infinite impulse response) filter, which may reduce noise but may introduce a delay. A first order FIR (finite impulse response) filter may greatly reduce the cyclic noise by taking advantage of the cyclic/periodic nature of the waveform, but may also introduce a delay. A nonlinear filter may prove more responsive, but without tracking the average.

In one set of embodiments, if the cycle difference is small, the filter may be set to whatever the average value was over the last cycle, otherwise the filter may be set to a sum of the filter value from the previous cycle and the cycle difference. A simple, uniform weight may be used, with a large FIR filter (e.g. 16 stages) with length equal to the cycle period. A full cycle FIR filter may slightly reduce performance, but may result in a more robust controller with respect to delay. Use of a full cycle IIR filter may similarly result in a slightly reduced performance, but a more robust controller with respect to delay. A full cycle IIR filter may provide essentially the same results as a full cycle FIR filter, but may require only a single stage and may therefore be easier to implement. Some issues that may be applicable to the controller shown in FIG. 18 and considered for filtering include: regulating the cycle average voltage, almost identical cycles in steady-state, and exploiting the cyclic/periodic properties to generate a most suitable (possibly ideal) filter. It should also be noted that feedback gain may be limited by the noise. Thus, reducing the noise should allow an increase in gain, which may further improve the response.

Overall, embodiments of a single-cycle charge regulator as disclosed herein may be operated at a constant frequency without requiring compensation (while embodiments discussed herein feature steady-state control, the single-charge regulator may function equally well even when the steady-state duty cycle is zero), may have a fast transient response and remain robust to noise filtering, and may require setting only a single gain parameter. Additional improvements may include obtaining a most suitable (or ideal filter) to limit noise spikes, reducing the offset (which may include tuning the neutralizer element using symmetric or non-symmetric damping factor, and/or using a nonlinear error, e.g. signed error squared), and an auto gain setting mechanism for the feed-forward gain (such as Gain block 1810). With conventional PWM control, when attempting to correct a transient in a single cycle, the inductor current may be left in an arbitrary (although deterministic) state with respect to the load current. Various embodiments of the control system and methods presented herein are directed at keeping (or attempting to keep) the inductor current in its original state subsequent to the single cycle correction. While the state of the inductor current may still be arbitrary with respect to the load current during the transient event, the control methods presented herein offer a new type of charge mode control with the advantages of being potentially compensation free and having a fast transient response.

It should also be noted that while various embodiments disclosed herein include a voltage regulator in a switching power supply, the various systems and methods described herein may be equally applied to other state variables in different systems, e.g. to current, temperature, speed, flow rate, etc., for other control applications like motor drives, fan drives, flow controls, oven controls, etc. Furthermore, the control mode may include PWM control or other type of control suitable for increasing/decreasing desired voltage and/or current levels (or state variable levels) in the system. Therefore, the control system disclosed in FIG. 18 is exemplary of a regulated system, which may be controlled according to the flow diagram shown in FIG. 22.

Figure 22:
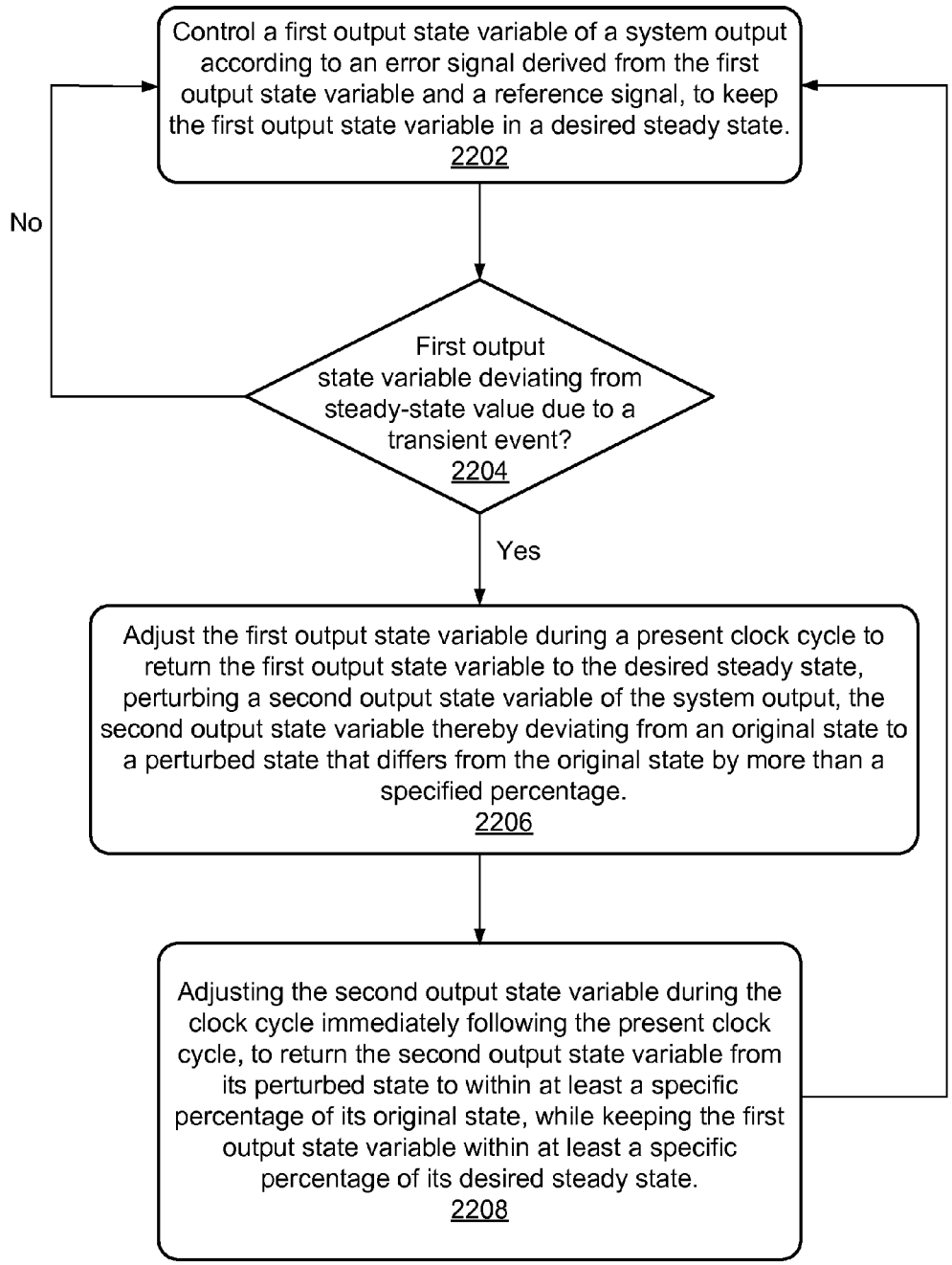
FIG. 22 shows a flow diagram of one embodiment of a method for controlling output state variables of a regulated system.

As indicated in FIG. 22, a system output may be regulated by controlling a first output state variable of the system output (e.g. output voltage) according to an error signal derived from the first output state variable and a reference signal, to keep the first output state variable in a desired steady-state (2202). The first output state variable may be controlled by way of adjusting a control variable (e.g. the duty-cycle value of a PWM signal), which may in turn affect the value of the first output state variable (e.g. the PWM signal affecting the output voltage). In response to the first output state variable deviating from the desired steady-state due to a transient event on the system output ("Yes" branch in 2204), the first output state variable may be adjusted during a present clock cycle to return the first output state variable to the desired steady-state (2206). This may, again, be performed by adjusting the control variable, which may in turn affect the value of the first output state variable. As part of this adjustment, a second output state variable of the system output (e.g. an inductor current affected by the first output state variable, i.e. by the output voltage) may be perturbed, resulting in the second output state variable deviating from an original state to a perturbed state that differs from the original state by more than a specified percentage (2206).

The second output state variable may then be adjusted during the clock cycle immediately following the present clock cycle, to return the second output state variable from its perturbed state to within at least a specific percentage of its original state (e.g. return the output state variable where it was during steady-state, prior to the transient event), while keeping the first output state variable within at least a specific percentage of its desired steady-state, preferably at the steady-state itself (2208). This may, again, be performed by further adjusting the control variable in such a way, the value of the first output state variable remains within at least a specific percentage of its desired steady-state value, while the second output state variable is returned to within at least a specific percentage of its original state. The adjustment of the first output state variable in response to the transient event (in 2208) may further include perturbing one or more control state variables (such as duty cycle value of a PWM control signal), which may result in one or more of the control state variables deviating from their respective original states to respective perturbed states different from the respective original states by more than a specified percentage. The perturbed control state variables may then be adjusted during the clock cycle immediately following the present clock cycle, to return the perturbed control state variables from their respective perturbed states to within at least a specific percentage of their respective original states, while keeping the first output state variable within at least a specific percentage of its desired state, preferably at the desired steady-state itself. For example, the output voltage may be adjusted in response to a deviation of the output voltage. The inductor current may then be adjusted to counter this deviation, and may then be (attempted to be) returned to its original value.

Although the embodiments above have been described in considerable detail, numerous variations and modifications will become apparent to those skilled in the art once the above disclosure is fully appreciated. It is intended that the following claims be interpreted to embrace all such variations and modifications. As previously mentioned, the single-cycle control method disclosed herein may be applied equally to various systems in which a control mechanism is employed to regulate a desired state variable, such as output state variables or other regulated state variables. For example, voltage, current, fan speed, liquid flow rate, or other similar state variables may be regulated. Furthermore, the mode of control may include PWM control, pulse density modulation or the like, and other modes of control in which the overall value of a corresponding control signal or control variable needs to be specified and/or varied, regulate the behavior of the system state variable or variables as disclosed herein. It should further be noted that the use of the phrase "means for" in the appended claims is expressly intended to invoke the provisions of 35 U.S.C. §112, sixth paragraph.

I claim:

1. A system for controlling a voltage regulator having an output, the system comprising:
    means for generating an error value based on an output voltage developed at the output of the voltage regulator,. and a reference value;
    means for regulating steady-state behavior of the output voltage, according at least to a first control value derived from the error value;
    means for correcting the output voltage responsive to a transient deviation of the output voltage, according at least to a second control value derived from the error value; and
    means for adjusting a charge at the output of the voltage regulator during a present cycle and according at least to a third control value, responsive to the transient deviation of the output voltage, wherein the present cycle is subsequent to a preceding cycle during which the response of the voltage regulator to the transient deviation is corrected, and wherein the third control value is derived at least from:
        a value of the first control value during the present cycle;
        a value of the first control value during the preceding cycle; and
        a value of the second control value during the preceding cycle.

2. The system of claim 1, further comprising means for adjusting the output voltage according to a fourth control value derived from the first control value, the second control value, and the third control value.

3. The system of claim 2, wherein the means for adjusting the output voltage comprise a controller configured to control the output voltage through a pulse width modulated (PWM) signal;
    wherein the fourth control value represents an overall duty-cycle value for the PWM signal.

4. The system of claim 3, wherein the first control value represents a steady-state duty-cycle value for the PWM signal.

5. The system of claim 4, wherein the second control value represents an adjustment to the steady-state duty-cycle value to decrease response time of the voltage regulator when correcting the output voltage in response to the transient deviation of the output voltage.

6. The system of claim 4, wherein the third control value represents a difference between the overall duty-cycle value and the steady-state duty-cycle value.

7. The system of claim 2, further comprising means for updating the third control value, comprising:
    means for subtracting a present value of first control value from a present value of the fourth control value, and adding the result to the previous value of the third control value.

8. The system of claim 2, further comprising means for generating the fourth control value, comprising:
    means for adding a present value of the first control value to a present value of the second control value, and subtracting from the result a previous value of the third control value.

9. The system of claim 1, wherein the reference value represents a reference voltage.

10. A method for controlling a voltage regulator having an output configured to provide an output voltage, the method comprising:
    regulating a steady-state behavior of the output voltage, according at least to a first control value derived from a value of the output voltage and a reference value;
    correcting the output voltage responsive to a transient deviation of the output voltage, according at least to a second control value derived from the value of the output voltage, the reference value, and a gain of the voltage regulator; and
    adjusting a charge at the output of the voltage regulator during a present cycle subsequent to a preceding cycle during which said correcting is performed, responsive to the transient deviation of the output voltage, wherein said adjusting is performed based on a third control value derived at least from:
        a value of the first control value during the present cycle;
        a value of the first control value during the preceding cycle; and
        a value of the second control value during the preceding cycle.

11. The method of claim 10, wherein said regulating the steady-state behavior of the output voltage comprises:
    generating an error value by subtracting the value of the output voltage from the reference value;
    providing the error value as input into a proportional/integral controller; and
    the proportional/integral controller generating the first control value based on the error value.

12. The method of claim 10, wherein said correcting comprises:
    generating an error value by subtracting the value of the output voltage from the reference value;
    adjusting the error value according to the gain of the voltage regulator; and
    providing the adjusted error value as the second control value.

13. The method of claim 10, further comprising regulating the output voltage, according to a fourth control value derived from the first control value, the second control value, and the third control value.

14. The method of claim 13, wherein said regulating the output voltage comprises:
    adding the first control value to the second control value to obtain a sum of the first control value and the second control value;
    subtracting the third control value from the sum of the first control value and the second control value to obtain the fourth control value;

providing the fourth control value as input to a controller; and the controller regulating the output voltage according to the fourth control value.

15. The method of claim 14, wherein said the controller regulating the output voltage comprises the controller adjusting the output voltage through a pulse width modulated (PWM) signal;

wherein the fourth control value represents a duty-cycle value for the PWM signal.

16. A method for regulating a system output, the method comprising:

controlling a first output state variable of the system output according to an error signal derived from the first output state variable and a reference signal, to keep the first output state variable in a desired steady-state;

in response to the first output state variable deviating from the desired steady-state due to a transient event on the system output, adjusting the first output state variable during a present clock cycle to return the first output state variable to the desired steady-state, comprising:

perturbing a second output state variable affected by the first output state variable, resulting in the second output state variable deviating from an original state to a perturbed state different from the original state by more than a specified percentage of the original state; and adjusting the second output state variable during a next clock cycle immediately following the present clock cycle, to move the second output state variable from its perturbed state towards a state that is within at least the specific percentage of its original state, while keeping the first output state variable within at least a specific percentage of the desired steady-state.

17. The method of claim 16, wherein said adjusting the first output state variable further comprises:

perturbing one or more control state variables, resulting in at least one of the one or more control state variables deviating from a respective original state to a respective perturbed state different from the respective original state by more than a specified percentage of the respective original state.

18. The method of claim 17, further comprising:

adjusting the at least one of the one or more control state variables during a next clock cycle immediately following the present clock cycle, to move the at least one of the one or more control state variables from its respective perturbed state towards a state that is within at least the specific percentage of its respective original state, while keeping the first output state variable within at least a specific percentage of the desired state.

19. A system comprising:

a processor;

a memory element configured to store programming instructions executable during a present clock cycle by the processor, to:

generate an error value based on a reference value and an output value corresponding to an output voltage of a power converter;

calculate a steady-state control value from the error value;

calculate a transient control value from the error value and a gain value corresponding to a gain of the power converter;

calculate a target control value from:
the steady-state control value;
the transient control value; and
the steady-state control value calculated during a preceding clock cycle, the transient control value calculated during the preceding clock cycle, and the target control value calculated during the preceding clock cycle; and control circuitry configured to generate a control signal according to the target control value, and regulate the output voltage of the power converter using the control signal.

20. A system comprising:

first control circuitry configured to generate an error signal from:
a reference voltage; and
an output voltage appearing at an output of a power converter;

second control circuitry configured to regulate steady-state behavior of the output voltage, according to a first control value determined based on the error signal;

third control circuitry configured to adjust the output voltage in response to a transient event on the output voltage, according to a second control value determined based on the error signal and a gain of the power converter;

fourth control circuitry configured to adjust a charge at the output of the power converter responsive to the transient event and during a clock cycle subsequent to a preceding clock cycle during which the output voltage is adjusted in response to the transient event, and wherein the fourth control circuitry is configured to adjust the charge according to a third control value determined based at least on:

the first control value from the clock cycle subsequent to the preceding clock cycle;

the second control value from the preceding clock cycle; and the third control value from the preceding clock cycle.

* * * * *

UNITED STATES PATENT AND TRADEMARK OFFICE
CERTIFICATE OF CORRECTION

PATENT NO. : 8,575,910 B2  
APPLICATION NO. : 13/007779  
DATED : November 5, 2013  
INVENTOR(S) : Young Page 1 of 1

It is certified that error appears in the above-identified patent and that said Letters Patent is hereby corrected as shown below:

In the Claims:

Claim 1, Column 13, Line 28, please delete "regulator,." and substitute -- regulator, --.

Signed and Sealed this
Twenty-fourth Day of December, 2013

Margaret A. Focarino
*Commissioner for Patents of the United States Patent and Trademark Office*